United States Patent
Paluzzi et al.

(10) Patent No.: US 7,099,971 B1
(45) Date of Patent: Aug. 29, 2006

(54) ARBITRATION SYSTEM

(75) Inventors: Nicholas Paluzzi, Hopkinton, MA (US); Philip M. Sailer, Needham, MA (US); Stephen L. Scaringella, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 459 days.

(21) Appl. No.: 10/606,819

(22) Filed: Jun. 26, 2003

(51) Int. Cl.
*G06F 13/00* (2006.01)

(52) U.S. Cl. .................................................... 710/116
(58) Field of Classification Search .................. None
See application file for complete search history.

(56) References Cited

U.S. PATENT DOCUMENTS

| | | | | |
|---|---|---|---|---|
| 4,472,787 A * | 9/1984 | Busby | ........................ | 710/105 |
| 4,494,192 A * | 1/1985 | Lew et al. | .................. | 710/112 |
| 5,067,071 A * | 11/1991 | Schanin et al. | ............. | 710/113 |
| 5,313,641 A * | 5/1994 | Simcoe et al. | .............. | 710/242 |
| 5,471,590 A * | 11/1995 | Melo et al. | ................. | 710/108 |
| 5,611,058 A * | 3/1997 | Moore et al. | ............... | 710/311 |
| 5,644,733 A * | 7/1997 | Kalish et al. | ............... | 710/113 |
| 5,890,217 A * | 3/1999 | Kabemoto et al. | .......... | 711/141 |
| 6,009,482 A * | 12/1999 | Robertson | .................... | 710/35 |
| 6,073,199 A * | 6/2000 | Cohen et al. | ............... | 710/113 |
| 6,247,087 B1 * | 6/2001 | Riley et al. | ................. | 710/309 |
| 6,457,085 B1 * | 9/2002 | Reddy | ........................ | 710/305 |
| 6,523,076 B1 * | 2/2003 | Kruse | .......................... | 710/119 |
| 6,687,795 B1 * | 2/2004 | Arimilli et al. | ............. | 711/146 |
| 6,691,191 B1 * | 2/2004 | Kobayashi et al. | ......... | 710/107 |

* cited by examiner

*Primary Examiner*—Paul R. Myers

(57) ABSTRACT

A system and method wherein a bus arbiter grants access to a bus to bus-coupled clients in order to provide access to a memory resource shared by the clients in response to "address retry" conditions induced by such clients. The bus arbiter provides access to the bus in response to whether one of the requesting clients experienced an "address retry" condition during its previous bus access. If such an address retry condition was experienced during its previous bus access, the bus arbiter grants such one of the requesting clients access to the bus at the earliest opportunity. Otherwise, the bus arbiter provides bus access to the requesting one, or ones, of the clients based on criteria independent of "address retry" conditions being induced on the bus.

2 Claims, 3 Drawing Sheets

ARBITRATION SYSTEM

TECHNICAL FIELD

This invention relates generally to arbitration systems, and more particularly to arbitration systems wherein a plurality of clients shares data with a shared memory resource via a shared bus and wherein the clients are capable of inducing an "address retry" (ARTRY) condition on the bus.

BACKGROUND

As is known in the art, many data systems have a plurality of clients that share a memory resource via a bus. At times, more than one of these clients may request access to the shared memory resource. Thus, a bus arbiter is provided to determine which client will be granted access to the memory resource via the bus. One typical algorithm, or criteria, used by the bus arbiter to resolve multiple requests for the memory resource is to grant access to the bus based on a first come-first served basis.

In executing some data processing requirement, a first client may retrieve data located at a particular shared memory location, process the retrieved data locally, and after processing such data store the processed data back into the shared memory resource at the same memory location. When any client wishes to process data located in the shared memory, the client requests access to the bus. After the client is granted access to the bus by the bus arbiter, it executes an address phase and an associated data phase on the bus, thus retrieving the shared data to a resource that is local to the client. Assume that another, i.e. second, client is later granted access to the bus by the bus arbiter. Assume also that this second client wishes to process data located at the same memory location while the first client is still locally processing the data it has retrieved from that memory location. As noted above, after being granted access to the bus by the bus arbiter, the second client initiates an address phase on the bus. The other clients on the bus monitor the address placed on the bus during the address phase by the client who was granted access to the bus. In this example, the first client detects that the address placed in the bus by the second client during the second client's address phase refers to data that is currently being processed locally by the first client. In response to the detected address, the first client induces an "address retry" (ARTRY) condition on the bus. In response to the ARTRY condition induced on the bus by the first client, the second client terminates its address phase and does not execute the associated data phase. Subsequent bus requests by the bus clients are resolved by the bus arbiter in accordance with certain predetermined criteria. Thus, the bus arbiter may next grant access to the bus to the first client or some other, i.e., a third client. This grant, however, was issued independently of whether any one of the clients had its address phase interrupted by an ARTRY condition being induced on the bus during the previous bus access. Thus, after the first client completes it's desired data processing, and the second client re-requests access to the bus, the bus arbiter will grant access to the bus in accordance with predetermined criteria, independent of whether a requesting client, here the second client, experienced an ARTRY condition during the address phases of its previous bus access. It should be noted that there might be a number of other clients wishing access to the bus. With such an arrangement, the bus arbiter is not sensitive to this ARTRY condition. The result of such insensitivity is that bus access latency is indeterminate for the second bus client due to the possibility of bus access being granted to other clients before the second client re-obtains access to the bus.

SUMMARY

In accordance with the present invention, a system and method are provided wherein a bus arbiter grants access to a bus to bus-coupled clients responsive to ARTRY conditions induced on the bus by such clients.

In one embodiment, the bus arbiter provides access to the bus in response to whether one of the requesting clients experienced an ARTRY condition during its previous bus access. If such an address retry condition was experienced during its previous bus access, the bus arbiter grants such one of the requesting clients access to the bus at the earliest possible opportunity. Otherwise, the bus arbiter provides bus access to the requesting one, or ones, of the clients based on criteria independent of ARTRY conditions being induced on the bus.

In one embodiment, a plurality of clients is coupled to the bus. Each client is capable of inducing an ARTRY condition on the bus when an address for the shared memory produced on the bus during the address phase by one of the clients is an address that references data being locally processed by another one of the clients. The other one of the clients induces the ARTRY condition on the bus when the address for the shared memory produced on the bus corresponds to the address of data being locally processed by such other one of the clients. The other one of the clients is the client inducing the ARTRY condition on the bus. The bus arbiter is responsive to bus access requests from one or ones of such clients to grant access to the bus. The granted bus access by one of such clients is used to transfer data between the client and the shared memory. The bus arbiter provides access to the bus in response to whether one of the requesting clients experienced an induced ARTRY condition during its previous bus access. If so, the bus arbiter grants such one of the requesting clients access to the bus at the earliest opportunity; otherwise, the bus arbiter provides bus access to the requesting one or ones of the clients based on other criteria.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
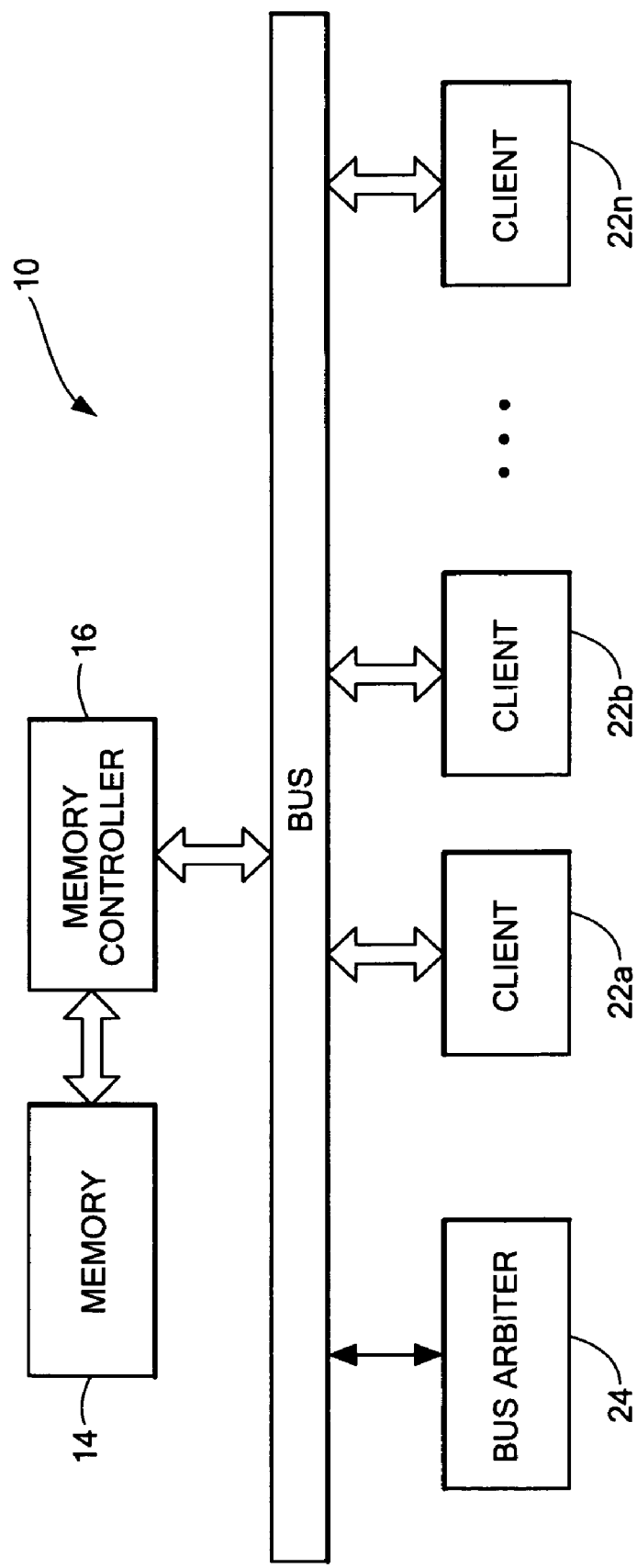
FIG. 1 is a block diagram of a data system according to the invention.

Referring now to FIG. 1, a data system 10 is shown having a bus 12 coupled to a shared memory 14 though a Memory Controller 16. The system 10 includes a plurality of clients 22a–22n. Also coupled to the bus 12 is a bus arbiter 24 for managing bus access requests to the bus 12 by the clients 22a–22n. As will be described in more detail below, the bus arbiter 24 grants access to the bus 12 in accordance with "address retry" (ARTRY) conditions induced on the bus 12 by the clients 22a–22n.

More particularly, the bus arbiter 24 provides access to the bus 12 in response to whether one of the requesting clients 22a–22n experienced an ARTRY condition during its previous bus access. If such an ARTRY condition was experienced during the previous bus access, the bus arbiter 24 grants such one of the requesting clients 22a–22n access to the bus 12. Otherwise, the bus arbiter 24 provides bus access to the requesting one, or ones, of the clients 22a–22n based on criteria that are independent of whether ARTRY conditions were induced on the bus 12. For example, the criteria may be based on a "first come-first served" basis, a "round-robin" basis, or in accordance with the criteria described in co-pending patent application Ser. No. 09/671,038 filed Sep. 27, 2000, entitled *Data Storage System Having Separate Data Transfer Section and Message Network Having Bus Arbitration*, assigned to the same assignee as the present invention, the entire subject matter thereof being incorporated herein by reference.

Figure 2:
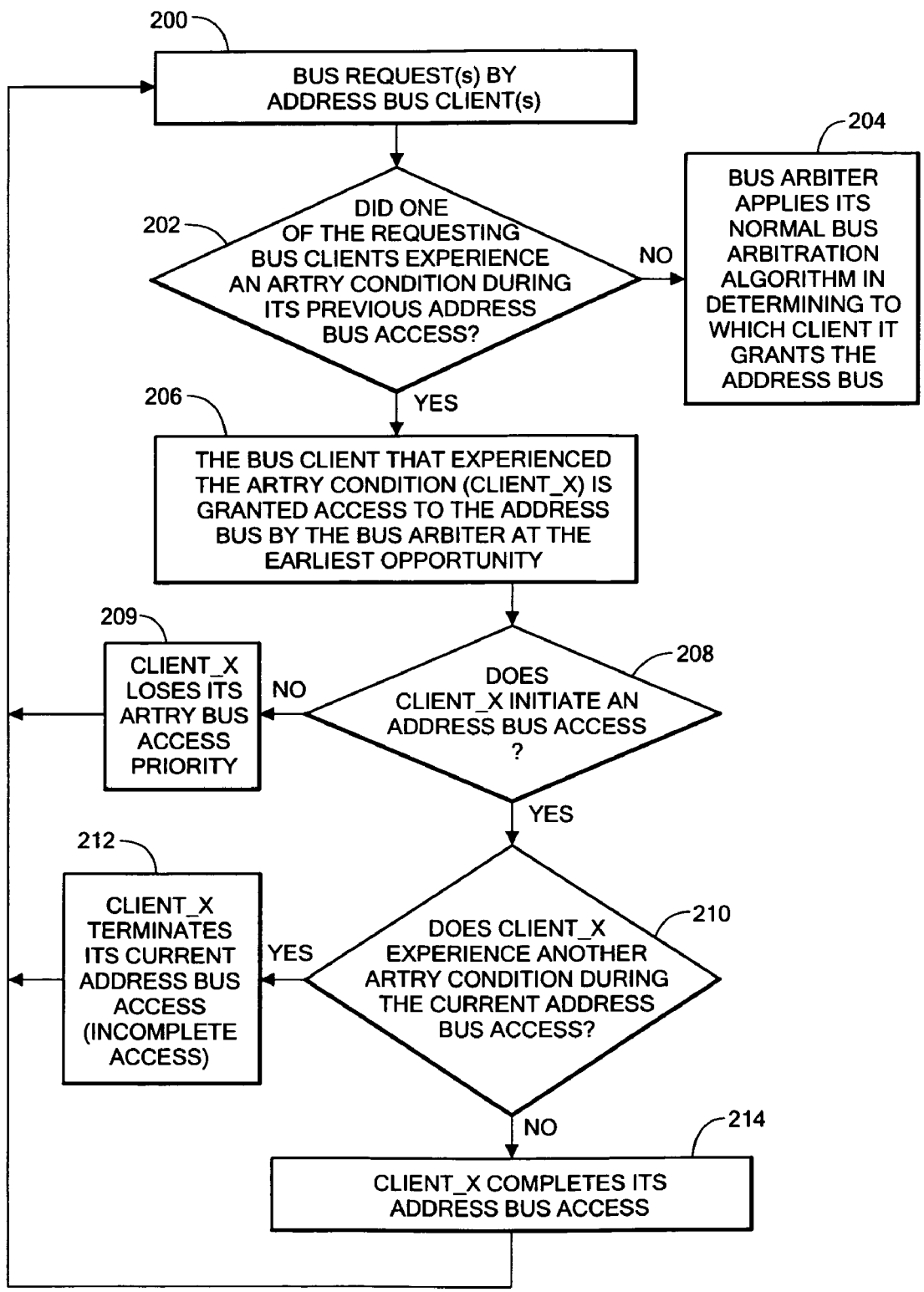
FIG. 2 is a logical flow diagram of the bus arbitration algorithm used in the system of FIG. 1.

Referring now to FIG. 2, in Step 200, requests for bus 12 are received by the bus arbiter 24 (FIG. 1). In Step 202, the bus arbiter 24 determines whether one of the clients 22a–22n experienced an ARTRY condition during its previous access to the address portion of the bus 12.

Figure 3:
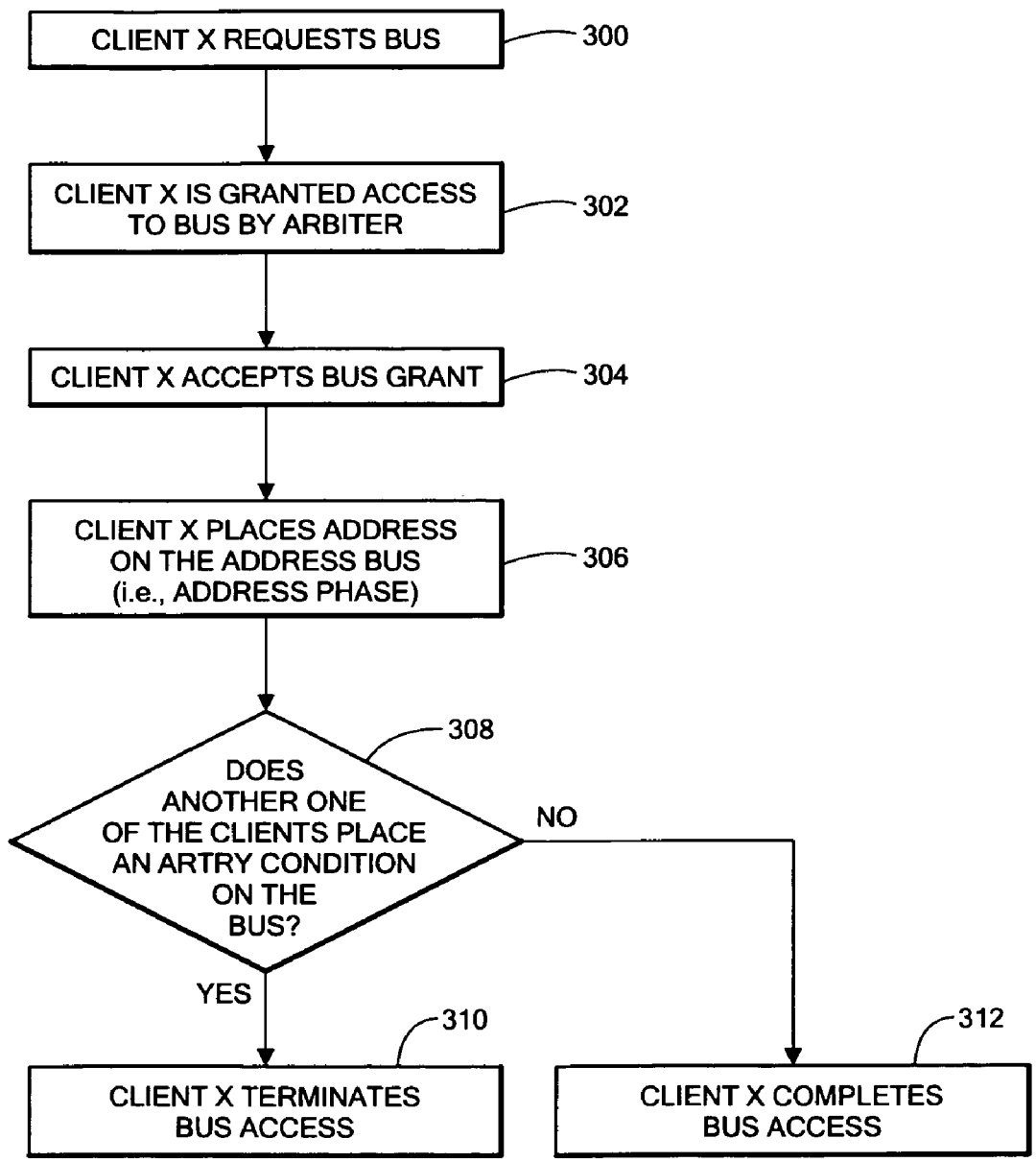
FIG. 3 is a logical flow diagram of a bus access by a client in the data system of FIG. 1.

More particularly, referring briefly to FIG. 3, consider for example that client 22a (Client A) requests access to bus 12 (Step 300). Assume that the bus arbiter 24 grants client 22a access to the bus 12, Step 302. In Step 304, client 22a accepts the bus 12 grant. The client 22a then places a memory 14 address on the address portion of the bus 12, Step 306. The client 22a then monitors the address portion of the bus 12 to determine whether one of the other clients 22b–22n induces an ARTRY condition on the bus 12.

That is, an ARTRY condition is induced on the bus 12 as follows: After the client is granted access to the bus, it executes an address phase and the associated data phase on the bus, thus retrieving the shared data to a resource that is local to the client. Assume that another, i.e. second, client is later granted access to the bus by the bus arbiter. Assume also that this second client wishes to process data located at the same memory location while the first client is still locally processing the data it has retrieved from that memory location. As noted above, after being granted access to the bus by the bus arbiter, the second client places an address on the bus. The other clients on the bus monitor the address placed on the bus by a client granted access to the bus. Here, in this example, the first client detects that the address placed in the bus by the second client during the address phase is data being used by the first client. In response to the detected address, the first client places an address re-try (ARTRY) condition on the bus. In response to the ARTRY condition placed on the bus by the first client, the second client relinquishes the bus before completing its command phase.

Continuing with FIG. 3, if in Step 308 client 22a detects that another one of the clients 22b–22n has induced an ARTRY condition on bus 12, client 22a terminates its address phase and relinquishes access to the bus 12, Step 310. On the other hand, if no ARTRY condition is detected in Step 308, client 22a completes its bus access, Step 312.

Referring again to FIG. 2, in Step 202, as noted above, the bus arbiter 24 determines whether one of the clients 22a–22n experienced an ARTRY condition during its previous access to the address portion of the bus. If no client experienced an ARTRY condition during its previous bus 12 access, the bus arbiter applies its normal algorithm or criteria (i.e., independent of ARTRY conditions) in determining which client 22a–22n is to be granted access to bus 12, Step 204.

On the other hand, if one of the clients experienced an ARTRY condition during its previous bus 12 access, the process proceeds to Step 206 and the bus client that experienced the ARTRY condition, for example, client_x, is granted access to the bus 12 at the earliest opportunity if client_x is requesting access to the bus 12.

In Step 208, the bus arbiter 24 detects whether client_x, here in this example client 22a, initiates access to the bus 12. If not, client_x loses its ARTRY bus access priority, Step 209. If, on the other hand, client_x initiates access to bus 12 when client_x is granted access to the bus 12, it monitors bus 12 to determine whether another ARTRY condition is being induced on bus 12 during this current bus access, Step 210.

If client_x detects an ARTRY condition in Step 210, it terminates its current access to the bus 12, Step 212. On the other hand, if in Step 210 client_x does not detect an ARTRY condition during the current bus access, client_x completes its bus access, Step 214.

A number of embodiments of the invention have been described. Nevertheless, it will be understood that various modifications may be made without departing from the spirit and scope of the invention. Accordingly, other embodiments are within the scope of the following claims.

What is claimed is:

1. A system, comprising:
   a bus;
   a plurality of clients coupled to the bus;
   a memory coupled to the bus and shared by the plurality of clients;
   a bus arbiter coupled to the bus, such bus arbiter granting access to the bus in response to such bus arbiter determining whether one of the clients requesting access to the bus has experienced an "address retry" condition during its previous bus access, and if so, the arbiter granting such one of the requesting clients priority access to the bus; otherwise, absent previous to an "address retry", condition on the previous bus access, providing bus access to the requesting one, or ones, of the clients based on a criteria independent of "address retry" conditions being induced on the bus.

2. A system, comprising:
   a bus;
   a plurality of clients coupled to the bus;
   a memory coupled to the bus and shared by the plurality of clients;
   wherein each one of the clients is capable of inducing an "address retry" condition on the bus, such condition occurring when a memory address introduced onto the bus during a bus access by one of the clients points to a data location in such memory currently being utilized by another one of the clients, such other one of the clients being the client inducing the "address retry" condition on the bus;
   a bus arbiter coupled to the bus, such bus arbiter being responsive to bus access requests from one or ones of such clients for granting access to the bus, such bus access by one of such clients being used to transfer data between the client and the memory, such bus arbiter providing access to the bus in response to such bus arbiter determining whether one of clients requesting access to the bus experienced an induced "address retry" condition during its previous bus access and, if so, the arbiter granting such one of the requesting clients priority access to the bus; otherwise, such bus arbiter providing bus access to the requesting one or ones of the clients based on criteria independent of an "address retry" condition being induced on the bus.

* * * * *